(12) United States Patent
Pecis

(10) Patent No.: US 6,752,530 B2
(45) Date of Patent: Jun. 22, 2004

(54) MIXER WITH HELICAL FEEDER AND RECIRCULATION SCROLL FOR PREPARING MATERIAL FOR ANIMAL FEEDING

(75) Inventor: Egidio Pecis, Zanica (IT)

(73) Assignee: Seko SpA, Curtarolo (IT)

( * ) Notice: Subject to any disclaimer, the term of this patent is extended or adjusted under 35 U.S.C. 154(b) by 0 days.

(21) Appl. No.: 10/247,820

(22) Filed: Sep. 20, 2002

(65) Prior Publication Data
US 2004/0057338 A1 Mar. 25, 2004

(51) Int. Cl.[7] .................................................. B01F 7/08
(52) U.S. Cl. ...................... 366/295; 366/296; 366/320; 366/324; 366/603
(58) Field of Search ................................ 366/292–296, 366/320, 324, 603, 222–224; 198/662–665

(56) References Cited

U.S. PATENT DOCUMENTS

| | | | | |
|---|---|---|---|---|
| 612,181 A | * | 10/1898 | Spurrier | 202/118 |
| 746,664 A | * | 12/1903 | Bourdeau | 366/320 |
| 2,112,848 A | * | 4/1938 | Jackson | 366/135 |
| 2,298,317 A | * | 10/1942 | Smith | 508/534 |
| 2,506,101 A | * | 5/1950 | Oltz | 366/309 |
| 2,761,657 A | * | 9/1956 | Rietz | 165/87 |
| 3,051,455 A | * | 8/1962 | Magester | 366/172.1 |
| 3,253,892 A | * | 5/1966 | Brignac et al. | 422/137 |
| 3,482,821 A | * | 12/1969 | Blackwood | 366/186 |
| 4,232,973 A | * | 11/1980 | Ligouzat | 366/156.2 |
| 4,444,509 A | * | 4/1984 | Steiner et al. | 366/157.2 |
| 4,500,209 A | * | 2/1985 | Steiner et al. | 366/157.2 |
| 4,509,860 A | * | 4/1985 | Lasar, III | 366/99 |
| 4,900,158 A | * | 2/1990 | Ugolini | 366/143 |
| 5,876,117 A | * | 3/1999 | Chen | 366/320 |
| 5,967,657 A | * | 10/1999 | West | 366/193 |
| 6,193,053 B1 | * | 2/2001 | Gaalswyk | 198/662 |

FOREIGN PATENT DOCUMENTS

| | | | |
|---|---|---|---|
| EP | 276645 A1 | * | 8/1988 |
| EP | 0 562 693 | | 3/1996 |
| EP | 1142471 A1 | * | 10/2001 |
| GB | 2002645 A | * | 2/1979 |
| GB | 2 060 419 | | 5/1981 |
| JP | 56141824 | | 11/1981 |
| JP | 2001-70776 | * | 3/2001 |

* cited by examiner

Primary Examiner—Charles E. Cooley
(74) Attorney, Agent, or Firm—Dykema Gossett PLLC

(57) ABSTRACT

A mixer for preparing feedstuffs and mixing pre-shredded forage with various feedstuffs and seed products for animal feeding, comprising a container body which internally accommodates a cylindrical helical feeder rotatably supported by the heads of the container body for the advancement of the products to be mixed. A recirculation scroll is provided inside the region delimited by the feeder and is suitable to impart to the products to be mixed a movement in the opposite direction with respect to the feeder. A tubular element is further provided for containing at least a central portion of the recirculation scroll.

9 Claims, 3 Drawing Sheets

MIXER WITH HELICAL FEEDER AND RECIRCULATION SCROLL FOR PREPARING MATERIAL FOR ANIMAL FEEDING

BACKGROUND OF THE INVENTION

The present invention relates to a mixer for preparing feedstuffs and mixing pre-shredded forage with various feedstuffs and seeds for animal feeding.

As is known, for preparing feedstuffs and mixing fodders, mixers are currently used to homogenize the various products subsequently distributed to the feeding troughs.

Solutions of the prior art provide a container body whereinto two scrolls operate being arranged side by side, the turns of such scrolls having orientation in the opposite direction with respect to the central portion, so that in practice the material is conveyed towards the center, where it rises and returns towards the peripheral region, where it is taken again by the scroll, which continues the mixing process.

Other solutions use three scrolls; in this case also, an attempt is made to impart to the product a circulating motion which facilitates mixing.

However, in the solutions of the prior art the products are, in a way, "ill-treated" by the scrolls, which in many cases apply pressure, compaction and defibration actions, thus damaging the organoleptic characteristics of the product.

Moreover, with the solutions of the prior art, clogging frequently occurs inside the mixer, with consequent further damage to the product, which is subjected to a highly intense compacting action.

SUMMARY OF THE INVENTION

The aim of the invention is to eliminate the above-mentioned drawbacks, by providing a mixer for preparing feedstuffs and mixing pre-shredded forage with various feedstuffs and seeds for animal feeding without altering the characteristics of the product while maintaining the product in a light and soft form which is particularly appreciated by the animals.

Within this aim, a particular object of the invention is to provide a mixer which allows to homogenize the various products in a very short time without causing the risk of clogging inside said mixer.

Another object of the present invention is to provide a mixer which, thanks to its particular constructive characteristics, is extremely reliable and safe in use.

Another object of the present invention is to provide a mixer for preparing feedstuffs and mixing pre-shredded forage with various feedstuffs and seeds for animal feeding which can be easily obtained starting from commonly commercially available elements and materials and is competitive from a merely economical point of view.

This aim and these and other objects which will become better apparent hereinafter are achieved by a mixer for preparing feedstuffs and mixing pre-shredded forage with various feedstuffs and seeds for animal feeding, according to the invention, wherein it comprises a container body which internally accommodates a cylindrical helical feeder rotatably supported by the heads of the container body for the advancement of the products to be mixed, a recirculation scroll being provided inside the region delimited by said feeder and being suitable to impart to the products to be mixed a movement in the opposite direction with respect to said feeder, a tubular element for containing at least a central portion of said recirculation scroll being further provided.

BRIEF DESCRIPTION OF THE DRAWINGS

Further characteristics and advantages will become better apparent from the description of a preferred but not exclusive embodiment of a mixer for preparing feedstuffs and mixing pre-shredded forage with various feedstuffs and seeds for animal feeding, illustrated only by way of non-limitative example in the accompanying drawings, wherein.

DESCRIPTION OF THE INVENTION

Figure 1:
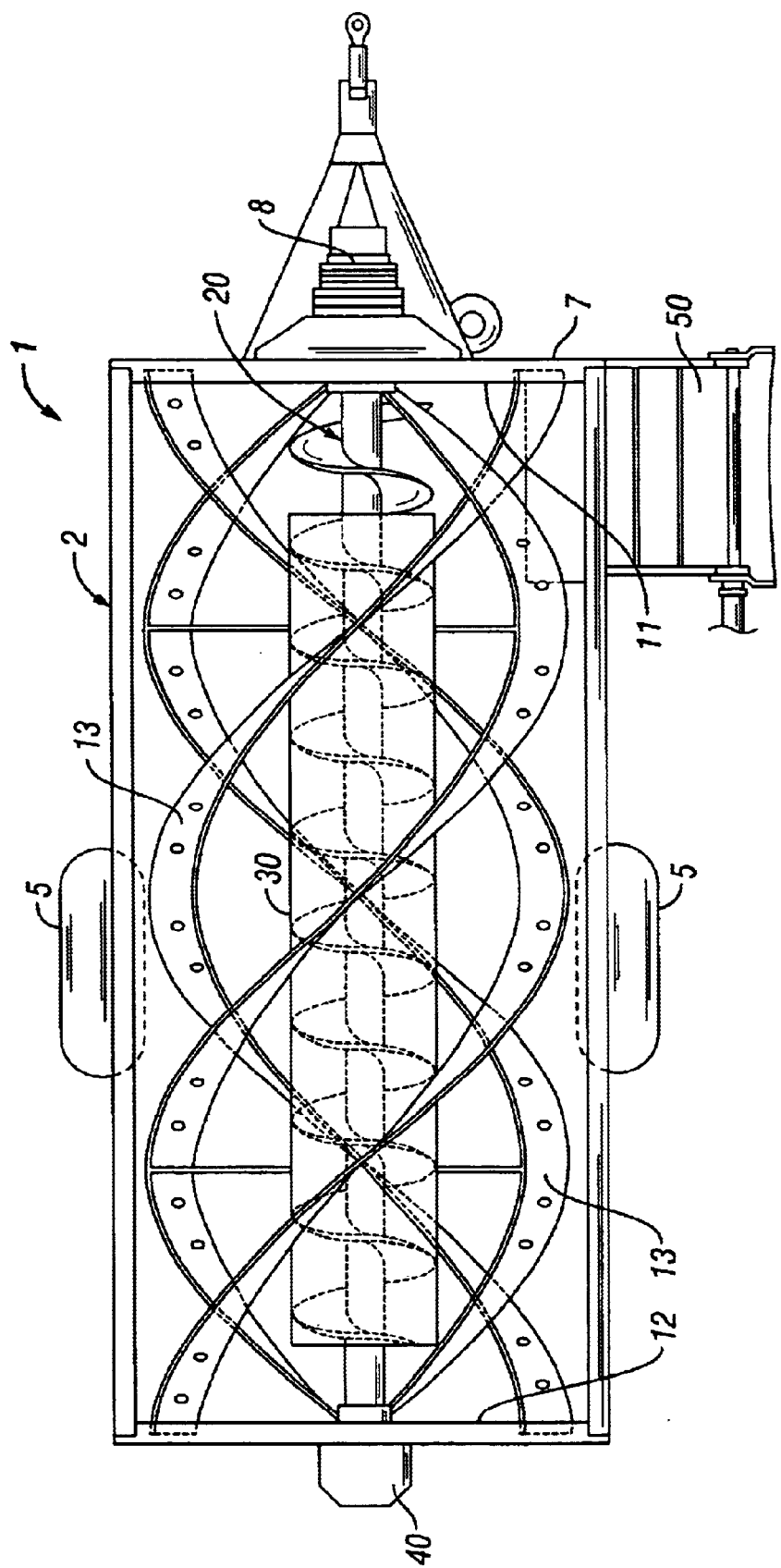
FIG. 1 is a top plan view of the mixer according to the invention.
Figure 2:
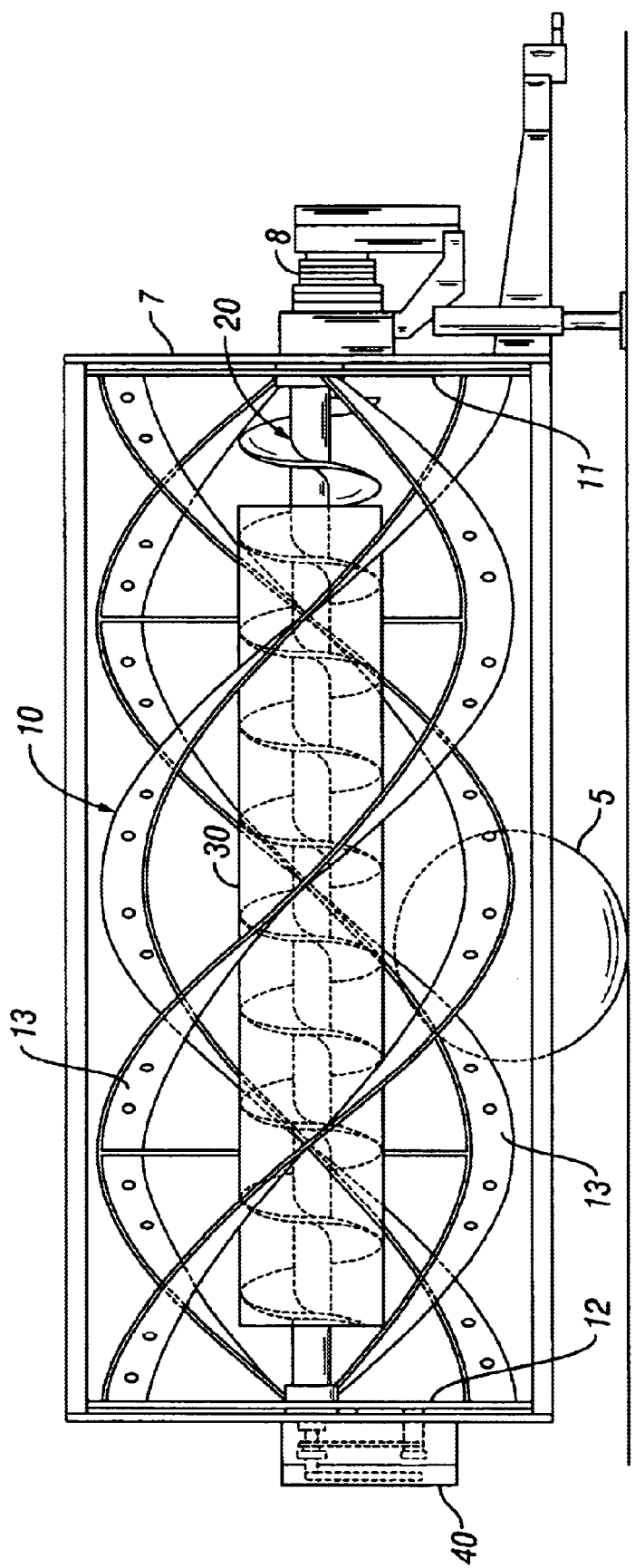
FIG. 2 is a side elevation view of the mixer, with the container shown in cross-section.

With reference to the figures, the mixer for preparing feedstuffs and mixing pre-shredded forage with various feedstuffs and seeds for animal feeding, according to the invention, generally designated by the reference numeral 1, comprises a container body 2 advantageously having, in a downward region, a semicylindrical shape 3 with slightly diverging sides 4.

The container body can preferably be trailer-mounted, and wheels 5 are provided for this purpose.

A conventional power take-off 8 for drawing motion from a tractor is provided at the front head 7 of the container.

Figure 3:
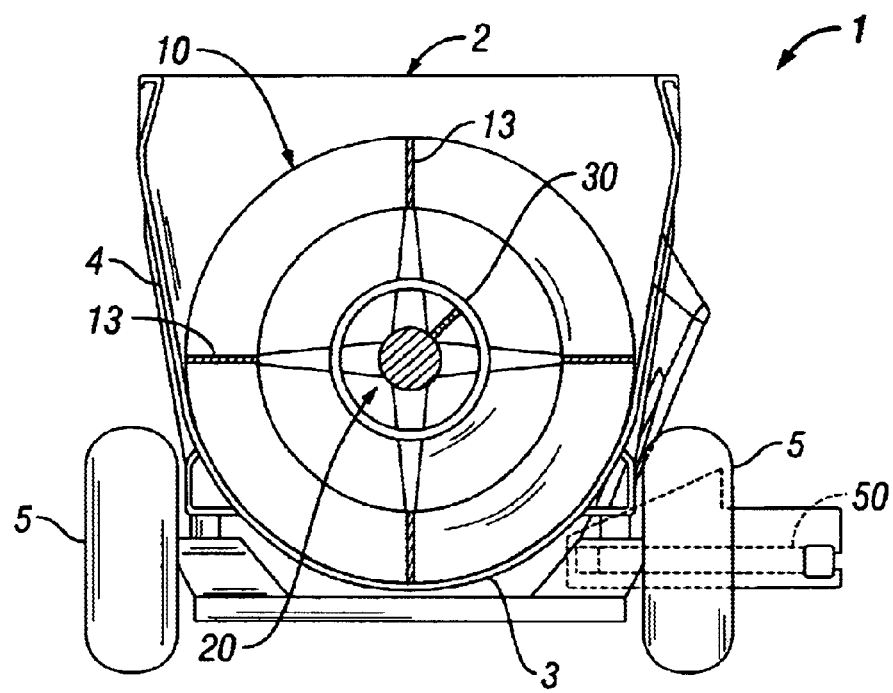
FIG. 3 is a sectional front elevation view of the mixer, taken along a transverse plane.
Figure 4:
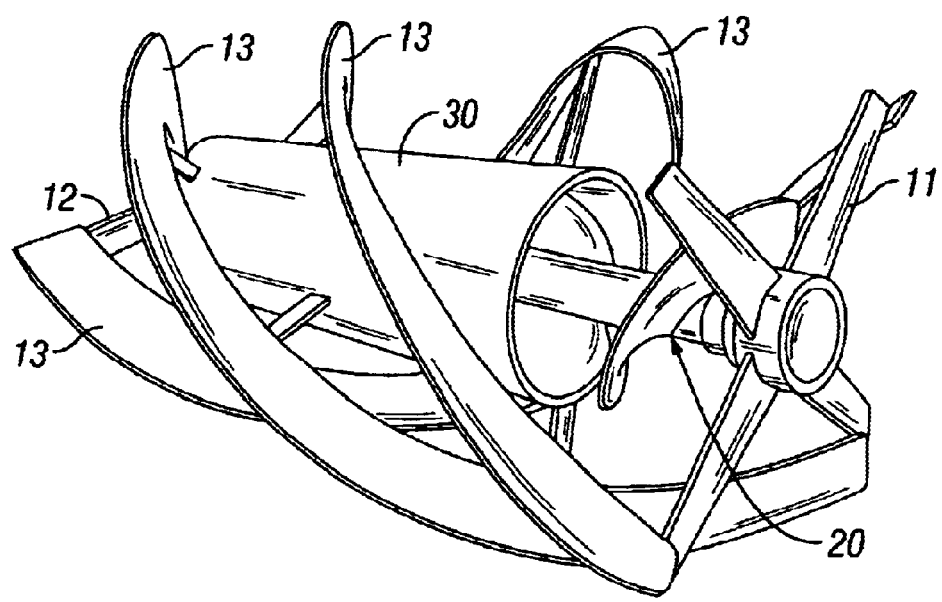
FIG. 4 is a schematic perspective view of the feeder and the recirculation scroll.

A feeder, generally designated by the reference numeral 10, is provided inside the container body and is shaped like a cylindrical helix with multiple starts; said feeder is constituted by a front cross 11 and a rear cross 12, which in practice support band-like elements 13 having a cylindrical helical arrangement and providing a helix with multiple starts, for example four starts in the specific example. As seen in FIGS. 3 and 4, the band-like elements have four starts with the band-like elements being disposed approximately 90° out of phase relative to adjacent band-like elements relative to a central longitudinal axis of the mixer.

The feeder 10 is designed to produce the advancement of the products to be mixed, and with reference to the drawings the products are advanced towards the front head 7.

Inside the feeder or conveyor 10, and preferably coaxially thereto, a recirculation scroll 20 is provided to return the material toward the rear head, thus producing a circulation of the material, which is not subjected to stress or compaction.

In order to avoid any compaction or damage to the material, the scroll 20 is arranged inside a tubular element 30 which affects the central portion of said region and preferably leaving free a space, at the front head 7 whereat the material is introduced, larger than the rear portion where the material is discharged and in practice taken up again by the feeder 10.

A chain-type transmission unit, designated by the reference numeral 40, is arranged at the rear head and allows to move the scroll and the feeder simultaneously.

Optionally it is also possible to use separate motor assemblies and change the speed ratios between the scroll and the feeder simply by changing the transmission ratios.

As already mentioned, the scroll moves the material in the opposite direction with respect to the direction produced by the feeder.

This can be achieved by using counter-orientated helixes for the feeder and the scroll, which rotate in the same direction; alternatively, in the case of helixes having the same orientation, it is possible to reverse the direction of rotation between the scroll and the feeder.

Moreover the bands 13 forming the feeder might be provided with holes in order to decrease the impact produced by friction with the advancing material; this is particularly useful if flours are also mixed, as they may create masses which are difficult to feed.

From the above description it is evident that the invention achieves the intended aim and objects, and in particular the fact is stressed that a mixer is provided which allows to obtain optimum mixing in a short time without damaging to the product.

For the sake of descriptive completeness, it is observed that a discharge outlet, generally designated by the reference numeral 50, is provided preferably at the front head, on the side of the container 2, and activated upon reaching the intended mixing for the product.

The invention thus conceived is susceptible of numerous modifications and variations, all of which are within the scope of the appended claims.

All the details may further be replaced with other technically equivalent elements.

In practice, the materials used, as well as the contingent dimensions and shapes, may be any according to requirements.

The disclosures in Italian Patent Application No. MI2000A000741 from which this application claims priority are incorporated herein by reference.

Where technical features mentioned in any claim are followed by reference signs, those reference signs have been included for the sole purpose of increasing the intelligibility of the claims and accordingly, such reference signs do not have any limiting effect on the interpretation of each element identified by way of example by such reference signs.

What is claimed is:

1. A mixer for preparing feedstuffs and mixing pre-shredded forage with various feedstuffs and seed products for animal feeding, wherein it comprises a container body which internally accommodates a cylindrical helical feeder rotatably supported by the heads of the container body for the advancement of the products to be mixed, said helical feeder including front and rear members which support band-like elements forming a cylindrical helix with multiple starts, said band-like elements being disposed approximately 90° out of phase relative to adjacent band-like elements relative to a central longitudinal axis of said mixer, a recirculation scroll being provided inside the region delimited by said feeder, and being adapted to impart to the products to be mixed a movement in the opposite direction with respect to said feeder, and a tubular element for containing at least a central portion of said recirculation scroll.

2. The mixer according to claim 1, wherein said container body has, in a transverse cross-section, a semicylindrical shape, which is arranged in a downward region thereof, with diverging sides.

3. The mixer according to claim 1, wherein said container body is adapted to be trailer-mounted.

4. The mixer according to claim 1, wherein said front and rear members being crosses.

5. The mixer according to claim 1, wherein it comprises, at the rear head, a transmission unit for the movement both of said scroll and feeder with a single power source.

6. The mixer according to claim 1, wherein said scroll is coaxial to said feeder.

7. The mixer according to claim 1, wherein said scroll is helically shaped and said helix is oppositely orientated with respect to said feeder and turns in the same direction.

8. The mixer according to claim 1, wherein said scroll is helically shaped and said helix has the same orientation as said feeder and turns in the opposite direction with respect to said feeder.

9. The mixer according to claim 4, wherein said band-like elements forming said feeder have holes in order to reduce the impact with the advancing material.

* * * * *